April 1, 1930.                    E. JACKSON                    1,752,740
                      HUB STRUCTURE FOR PNEUMATIC WHEELS
                             Filed May 2, 1928
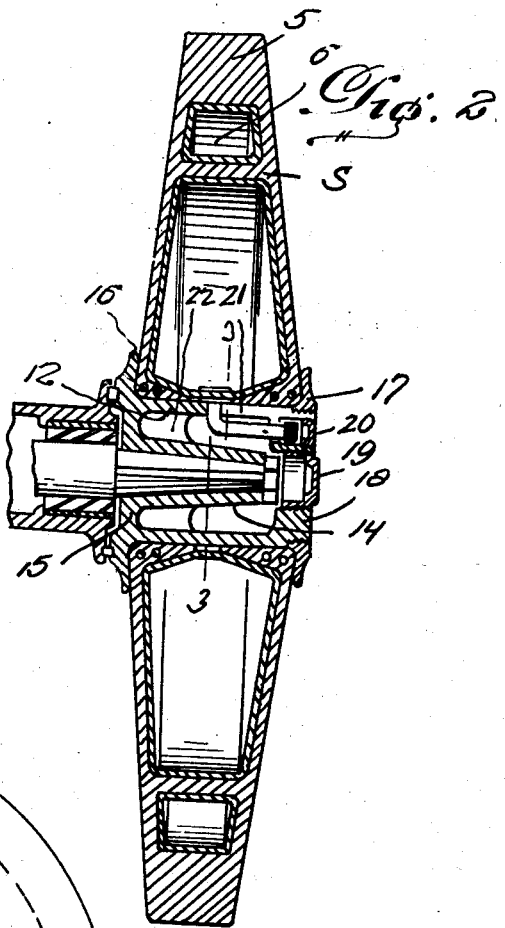
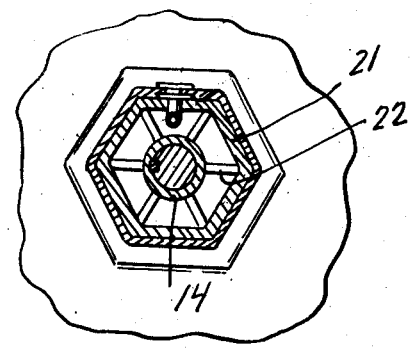
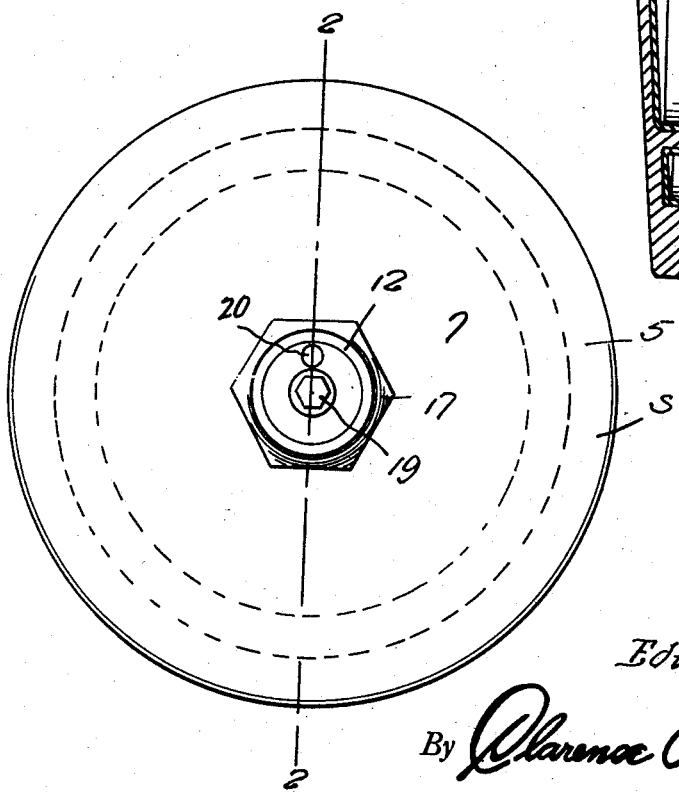
Inventor
Edwin Jackson,
By Clarence A. O'Brien
Attorney Patented Apr. 1, 1930

1,752,740

UNITED STATES PATENT OFFICE

EDWIN JACKSON, OF INDIANAPOLIS, INDIANA

HUB STRUCTURE FOR PNEUMATIC WHEELS

Application filed May 2, 1928. Serial No. 274,501.

The present invention relates to a pneumatic wheel for automobiles and the like vehicles and has for its prime object to provide a hub of reinforced construction.

Another very important object of the invention lies in the provision of a hub of this nature with an exceedingly simple structure that may be manufactured at a reasonably low cost and will be thoroughly reliable in use, efficient, strong and durable, and otherwise well adapted to the purpose for which it is designed.

With the above and numerous other objects in view as will appear as the description proceeds, the invention resides in certain novel features of construction, and in the combination and arrangement of parts as hereinafter more fully described and claimed.

In the drawings:

Figure 1 is a side elevation of the wheel embodying the features of my invention, Fig. 2 is a sectional view taken substantially on the line 2—2 of Fig. 1, Fig. 3 is a detail section taken substantially on the line 3—3 of Fig. 2.

Referring to the drawings in details, it will be seen that the letter S denotes a shoe which is provided with a solid tread portion 5 having imbedded therein a hollow annulus 6 preferably constructed of steel or the like.

The hub H is formed with an outer cylindrical portion and an inner tapered portion 14. The cylindrical portion 12 and the tapered portion 14 extend in the same direction from side 15 which has a fixed flange 16 thereon. A flange 17 is threaded on the other end of the cylindrical portion 12 and, of course, the beads 8 are held in place by these flanges 16 and 17. The other side 18 of the hub structure H is provided with a central threaded opening for receiving the cap 19 in order that this cap 19 may be removed so that access may be had to the nut which holds the spindle in the tapered portion 14. Another off-center opening is provided in the hub for receiving caps 20 so that access may be had to the extremity of the conduit 10. The cylindrical portion 12 is longitudinally slotted for a portion of its length as is indicated at 21 for allowing the passage of the conduit 10 when the inner tube 9 is being put in place or being taken from the shoe. The cylindrical portion 12 is braced with respect to the tapered portion 15 by a plurality of webs 22.

It is thought that the construction, utility, and advantages of this invention will now be clearly understood without a more detailed description of the structure thereof. It is desired, however, to point out that the structure is simple and will prove exceptionally durable and strong in use since the wheel is not subjected to ordinary punctures as with pneumatic tires because of the solid nonpuncturable tread portion which is strengthened by the provision of the light hollow metallic annulus 6. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A pneumatic wheel hub comprising a hollow cylindrical body open at one end and provided with internal and external threads, an axle receiving bearing structure protruding inwardly of the body from the closed end thereof, a cylindrical flange at one end of the body, an internally threaded annulus for the opposite end of the body, said annulus being provided with a threaded opening therein through which the usual tire tube valve is accessible, an externally threaded plug for engagement within the threaded opening, a second plug for threadable engagement within the internally threaded end of the body and reinforcing ribs between the said bearing and the body.

In testimony whereof I affix my signature.

EDWIN JACKSON.